D. DESHON, 2d.
Meat and Vegetable Cutter.
No. 5,629.
Patented June 13, 1848.
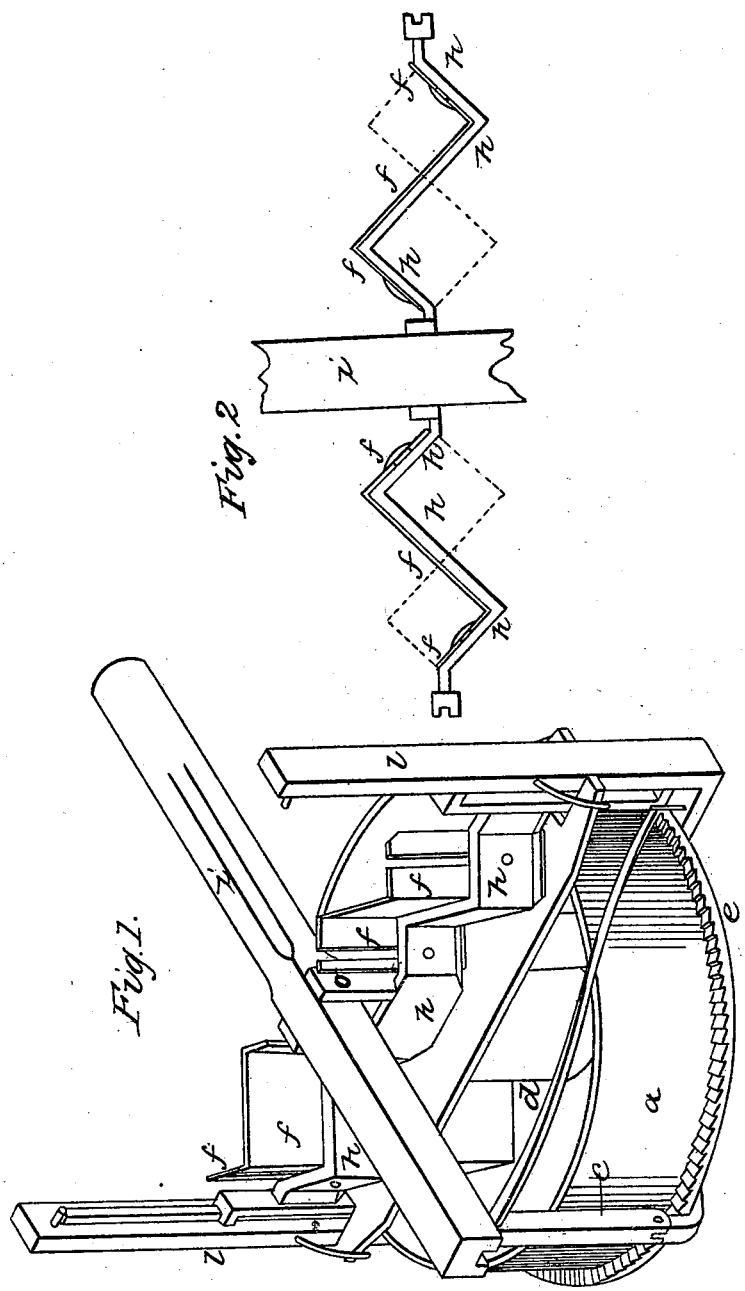

UNITED STATES PATENT OFFICE.

DANIEL DESHON, 2D, OF NEW LONDON, CONNECTICUT.

MEAT-CUTTER.

Specification of Letters Patent No. 5,629, dated June 13, 1848.

*To all whom it may concern:*

Be it known that I, DANIEL DESHON, 2d, of New London, in the county of New London and State of Connecticut, have invented an Improved Machine for cutting Meat and Vegetables, and that the following is a full, clear, and exact description of the principle or character which distinguishes it from all other things before known and of the usual manner of making, modifying, and using the same, reference being had to the accompanying drawing, which forms a portion of the description, in which—

Figure 1 is an isometrical view of the machine. Fig. 2 represents a plan of the knives.

The nature of my invention consists— first, in the arrangement of the knives, by which each knife cuts in an opposite direction from the other, by cutting across the material acted upon in two directions and dividing it into small pieces, instead of strips, as would be the case were the knives radial, or on the same relative angle to the center; secondly, the improved manner of working the pawl, or hand that turns the chopping dish, when a lever is used to move the knife up and down; and thirdly, in the combination of the lever with the frame and dish, by which the cutters can be worked without moving the dish, for to bring down the cutter, the handle is pressed down, thus holding the frame and dish steady without being fastened, which would not be the case if worked with a crank.

The construction is as follows: The bottom of the chopping dish (*a*) is circular in form, the sides rising to a proper height; this dish is centered in a frame of cast iron, the base of which is formed of two bars that cross at right angles with each other; the two ends of one of these bars are turned up at right angles, forming guides or standards (*b*) which serve to guide the knife in its motion up and down. To one arm of the other bar, a connecting rod (*c*) is jointed, which forms a fulcrum for the lever that works the knives: this rod *c* vibrates at its upper ends, to accommodate it to the attachment of the lever to the knives which rises in a straight line. To the upper end of this connecting rod there is a pawl (*d*) connected, that curves around one quarter of the circumference of the circle of the chopping dish, and acts on a ratchet (*e*) cut on the lower rim thereof—thus it will be obvious, that as the upper end of the rod (*o*) vibrates the pawl will turn the dish.

The knives (*f*) are of a zigzag form, as clearly shown in Fig. 2; or they may be set in a straight line inclined to the radius, but the knife on one side is set at opposite angles to that on the other side of the center; the counter cut being shown by the dotted lines; these knives (*f*) are attached to a bar (*h*) of the same figure, the ends of which slide in the ways formed in the standards *b*.

The lever (*i*) has one of its ends jointed to the connecting rod; and it is also jointed to the cross bar (*h*), the opposite end serves as a handle by which the knives are worked.

Having thus fully described my improvements, what I claim therein as new, and desire to secure by Letters Patent, is—

1. The arrangement and working of the knives as herein set forth, so as to cause them to cut steadily in one position, and mince the material fine without stirring the material up as above specified, by means of the cross position of the blades, and method of working them without changing their relative position to the frame.

2. The method of moving the dish by means of the pawl combined with the movable fulcrum, and worked by the straight lever that vibrates the knives.

DANIEL DESHON, 2ND.

Witnesses:
F. C. DONN,
J. J. GREENOUGH.